United States Patent [19]

Pinckney

[11] Patent Number: 5,968,857
[45] Date of Patent: Oct. 19, 1999

[54] GLASS-CERAMICS

[75] Inventor: Linda R. Pinckney, Corning, N.Y.

[73] Assignee: Corning Incorporated, Corning, N.Y.

[21] Appl. No.: 09/030,863

[22] Filed: Feb. 26, 1998

Related U.S. Application Data

[60] Provisional application No. 60/042,462, Mar. 31, 1997.

[51] Int. Cl.⁶ ..................................................... C03C 10/02
[52] U.S. Cl. ............................... 501/10; 501/69; 136/258
[58] Field of Search ............................ 501/5, 10, 69; 136/258

[56] References Cited

U.S. PATENT DOCUMENTS

| | | | |
|---|---|---|---|
| 3,681,097 | 8/1972 | Beall et al. | 106/39 |
| 3,681,102 | 8/1972 | Beall | 106/39 |
| 4,687,750 | 8/1987 | Pinckney | 501/10 |
| 5,028,567 | 7/1991 | Gotoh et al. | 501/10 |
| 5,330,939 | 7/1994 | Marazzi et al. | 501/10 |
| 5,476,821 | 12/1995 | Beall et al. | 501/10 |
| 5,491,116 | 2/1996 | Beall et al. | 501/5 |
| 5,561,089 | 10/1996 | Ishizaki et al. | 501/10 |
| 5,658,835 | 8/1997 | Onitani et al. | 501/10 |

FOREIGN PATENT DOCUMENTS

| | | |
|---|---|---|
| 0 710 627 A1 | 5/1996 | European Pat. Off. . |
| 1-208343 | 8/1989 | Japan . |
| 1221851 | 2/1971 | United Kingdom . |
| 1544779 | 4/1979 | United Kingdom . |

OTHER PUBLICATIONS

T. Dumas, A. Ramos, M. Gandais, J. Petiau, "Role of Zirconium in Nucleation and Crystallization of a ($SiO_2$, $Al_2O_3$, MgO, ZnO) Glass", 1985, pp. 129–132, Journal of Materials Science Letters.

E. Tkalčec, H. Ivanković, B. Gržeta, "Crystallization of High–Quartz Solid in Gahnite Glass–Ceramics", 1991, pp. 174–182, Journal of Non–Crystalline Solids.

*Primary Examiner*—Karl Group
*Attorney, Agent, or Firm*—Maurice M. Klee; Scott S. Servilla; Robert L. Carlson

[57] ABSTRACT

A transparent glass-ceramic comprising the following composition, expressed in terms of weight percent on an oxide basis: 45–65 $SiO_2$, 14–28 $Al_2O_3$, 4–13 ZnO, 0–8 MgO, 0–10 $TiO_2$, 0–6 $ZrO_2$, 0–8 BaO, 0–15 $Cs_2O$, ZnO+ MgO in combination being greater than or equal to about 8, and $TiO_2+ZrO_2$ in combination being greater than about 4.

30 Claims, No Drawings

GLASS-CERAMICS

This application claims the benefit of U.S. Provisional Application No. 60/042,462, filed Mar. 31, 1997.

FIELD OF THE INVENTION

The present invention relates to transparent spinel-based glass-ceramic materials.

BACKGROUND OF THE INVENTION

The materials of the present invention are most importantly substrate candidates for high temperature polysilicon thin films. Products based on thin films of polycrystalline silicon include solar cells and flat panel displays, in particular active matrix liquid crystal displays. The materials of the present invention are also useful, however, as a substrate material in various electric, electronic, and optoelectronic devices such as, for example, other forms of flat panel displays, solar batteries, photomasks, and optomagnetic disks.

Liquid crystal displays (LCDs) are typically comprised of two flat glass sheets that encapsulate a thin layer of liquid crystal material. An array of transparent thin film electrodes on the glass modulate the light transmission properties of the liquid crystal material, thereby creating the image. By incorporating an active device such as a diode or thin film transistor (TFT) at each pixel, high contrast and response speed can be achieved to produce high resolution displays. Such flat panel displays, commonly referred to as active matrix LCDs (AMLCD), have become the predominant technology for high performance displays such as notebook computers and portable televisions.

At present, most AMLCDs utilize amorphous silicon (a-Si) processes and have a maximum process temperature of 4500C. Nevertheless, it has long been recognized that the use of polycrystalline silicon (poly-Si) would offer certain advantages over a-Si. Poly-Si has a much higher drive current and electron mobility, thereby allowing reduction of TFT size and at the same time increasing the response speed of the pixels. It also is possible, using poly-Si processing, to build the display drive circuitry directly onto the glass substrate. Such integration significantly decreases costs and increases reliability and also allows for smaller packages and lower power consumption. By contrast, a-Si requires discrete driver chips that must be attached to the display periphery using integrated circuit packaging techniques such as tape carrier bonding.

Poly-Si is conventionally made by depositing amorphous silicon onto a glass sheet using chemical vapor deposition (CVD) techniques, and subsequently exposing the coated glass to high temperatures for a period of time which is sufficient to crystallize the a-Si to poly-Si. There are many methods for fabricating poly-Si, which can be grouped in two categories: low-temperature poly-Si methods, which utilize processing temperatures up to about 600° C., and high-temperature poly-Si methods, which typically employ temperatures as high as 900° C.

Many of the low-temperature methods employ techniques such as laser recrystallization, in which the substrate is held at a temperature of 400° C. and an excimer laser is used to melt and recrystallize the Si layer. The main disadvantage of laser recrystallization is difficulty in achieving good uniformity across the sample. Most of the TFTs have more than sufficient mobilities for on-board logic, but the fact that only a small area can be melted and recrystallized at a time leads to stitching problems. Low temperature poly-Si TFTs can also be made by thermally crystallizing amorphous silicon (maximum temperatures of 600° C.), but in order to make high quality transistors at such low temperatures the films typically must be treated for at least 25 hours. In addition, there are commonly several other high temperature processes following the crystallization step, including growing or annealing of the gate oxide and dopant activation.

The highest quality poly-Si TFTs are fabricated at temperatures of at least 900° C.: such processes enable formation of poly-Si films having extremely high electron mobility (for rapid switching) and excellent TFT uniformity across large areas. This fabrication process typically consists of successive deposition and patterning of thin films using elevated temperature processes which result in the substrate being heated to temperatures in the range of 900° C. There are very few materials capable of meeting this requirement. One approach has been using fused or vitreous silica as the substrate. Fused silica has a sufficiently high strain point of 990°–1000° C. but its thermal expansion coefficient (C.T.E.) is significantly lower than that of silicon, however, with a C.T.E. of $5 \times 10^{-7}/°C$. versus silicon's $37 \times 10^{-7}/°$ C. Furthermore, fused silica substrates are extremely expensive to produce, to the point where using them in large display applications is cost prohibitive.

It would therefore be desirable to develop transparent glass-ceramic materials having high strain points and coefficients of thermal expansion which are compatible with polycrystalline silicon, especially high temperature poly-Si.

SUMMARY OF THE INVENTION

One aspect of the present invention relates to a transparent glass-ceramic containing spinel as a predominant crystal phase, said glass-ceramic comprising the following composition as calculated in weight percent on an oxide basis: 45–65 $SiO_2$, 14–28 $Al_2O_3$, 4–13 ZnO, 0–8 MgO, 0–10 $TiO_2$, 0–6 $ZrO_2$, 0–15 $Cs_2O$, 0–5 BaO, ZnO+MgO in combination being greater than or equal to about 8, and $TiO_2+ZrO_2$ in combination being greater than about 4.

By transparent, it is meant that 1.1 mm thick sheets of the glass-ceramics of the present invention exhibit greater than 85 percent transmittance over the visible region (400nm to 700nm) of the spectrum. Preferably, for certain applications, it is also desirable that these sheets exhibit some transmittance in the near ultraviolet as well, for example, greater than 50 percent over the region 350–400 nm.

The transparent spinel-based glass-ceramics of the present invention exhibit a number of advantages compared to prior art glass-ceramics materials. For example, these glass ceramics exhibit a coefficient of thermal expansion between about $32–42 \times 10^{-7}/°$ C., and most preferably between about $35–40 \times 10^{-7}/°$ C., over the temperature range of 25°–300° C., providing a relatively close thermal match to silicon. The glass-ceramic materials of the present invention exhibit a strain point greater than 850° C., preferably greater than 875° C., more preferably greater than 900° C., and most preferably greater than 925° C.

These glass-ceramics consequently possess high thermal stability and can withstand temperatures of 900° C. for 24 hours without distorting, warping, or losing transparency. The predominant (and usually sole) crystal phase in these materials consists of spinel solid solution $(Zn,Mg)Al_2O_4$, although the spinel may be accompanied by minor amounts of other crystal phases, e.g., zirconia, Mg-petalite, β-quartz solid solution, or $MgTi_2O_5$ with no deleterious effects on transparency or properties. By predominant crystal phase, it is meant that this crystal phase is at least about 75 volume percent, more preferably at least 85 percent, and most preferably at least 95 percent of the total crystalline phases present. The glass-ceramics of the present invention are also preferably at least about 20 weight percent crystalline phases dispersed within a glassy matrix.

The glass-ceramics of the present invention exhibit excellent chemical durability, and are compatible with all cleaning procedures currently employed during TFT processing. They also exhibit densities less than 2.85 grams/cc, as well as hardnesses greater than 600 (Knoop, 100 g load).

The compatibility of the precursor glasses with conventional melting and forming techniques, particularly via rolling, renders these materials suitable candidates for the manufacture of large sheets. Glasses described herein can be melted at temperatures of 1550° C.–1600° C. Their higher rigidity and strength compared to that of glass (Young's modulus>$13 \times 10^6$ psi, modulus of rupture>$10 \times 10^3$ psi) would permit the use of thinner sheets when compared to glass materials.

In addition to substrates for thin film polysilicon solar cells, these refractory glass-ceramics could be useful in a wide variety of applications ranging from substrates employing high temperature thin films, such as active matrix liquid crystal displays (AMLCD's) to components for optical devices such as optical waveguides. They are particularly useful for substrates in AMLCD applications because the peripheral drive circuitry can be placed directly on the substrate, a cost and space savings. The high strain points of these glasses enable formation of transistors at much higher temperatures than was previously possible using more conventional (lower strain point) LCD substrates, thereby enabling formation of much higher mobility films. Drive circuitry requires very high quality polysilicon TFT's, which are best obtained via high temperature processing. These glass-ceramics are capable of withstanding temperatures of 900° C.

DETAILED DESCRIPTION OF THE INVENTION

Glass-ceramics consist of randomly oriented crystals dispersed within a matrix of residual glass and can be produced through controlled internal nucleation and crystallization of a precursor glass body. Hence, a glass forming batch of the desired composition is melted and that melt is cooled and simultaneously formed into a glass shape of a predetermined configuration utilizing conventional glass forming techniques. Glass forming batches for the inventive spinel crystal-containing glass-ceramic precursor glasses described herein are easily melted and the ensuing melts can be shaped into articles of widely varying geometries. The composition of the precursor glass, and the subsequently formed glass-ceramic, comprises or consists essentially of the following ingredients, expressed in weight percent:

| | | | |
|---|---|---|---|
| $SiO_2$ | 45–65 | BaO | 0–8 |
| $Al_2O_3$ | 14–28 | $Cs_2O$ | 0–15 |
| ZnO | 4–13 | | |
| MgO | 0–8 | | |
| $TiO_2$ | 0–10 | (ZnO + MgO) ≧ 8% | |
| $ZrO_2$ | 0–6 | ($TiO_2$ + $ZrO_2$) ≧ 4% | |

Fining agents, such as $As_2O_5$ or $Sb_2O_3$, may be added to the glass compositions described herein, if needed or desired. In addition, up to 5% of other oxides or fluorides, such as $Rb_2O$, $WO_3$, CaO, SrO, $Nb_2O_5$, $AlF_3$, $B_2O_3$, $Y_2O_3$ or $P_2O_5$ and/or up to 10% of $Bi_2O_3$, $Ta_2O_5$, $Ga_2O_3$, PbO, or $La_2O_3$, can be added if desired. The levels of $K_2O$, $Na_2O$, $Li_2O$, should preferably be limited to no more than 3%, and most preferably are zero, as it is desirable that the glass-ceramics of the present invention be free of mobile alkali ions.

If the amount of $SiO_2$ is less than 45%, the proportion of spinel to residual glass increases, causing the thermal expansion coefficient to increase. This also tends to make the glass-ceramics opaque. Further, if the amount of the $SiO_2$ exceeds 65%, the CTE may become too low for optimal match to silicon.

$Al_2O_3$ is a necessary component of the spinel, (Zn, Mg) $Al_2O_4$ (1 mole (ZnO, MgO) combines with one mole $Al_2O_3$). Therefore, if $Al_2O_3$ is less than 14 percent, too little spinel may be formed, and the thermal expansion coefficient might be too low. If the amount of $Al_2O_3$ exceeds 28 percent, the glass tends to become unstable, and the liquidus temperature increases, making the glass more difficult to melt.

Both the MgO and ZnO constituents are key spinel crystal formers with $Al_2O_3$. Therefore, either one or the other or both must be present in the glass-ceramic compositions. ZnO strongly favors the crystallization of very fine grained spinel crystals and helps minimize the crystallization of unwanted phases. A minimum of 4% ZnO is desired for optimal properties. ZnO should preferably be less than 13 weight percent to prevent the melting temperature from becoming too high, thereby making glass melting difficult. While all-Mg spinel ($MgAl_2O_4$) glass-ceramics can be made, MgO strongly promotes the growth of non-spinel phases such as Mg-petalite, β-quartz ss, and $MgTi_2O_5$, which tends to degrade transparency. A maximum of 8 percent MgO is therefore desired.

The sum of (ZnO+MgO) is preferably at least 8 weight percent in order to ensure sufficient crystallization of the spinel phase and obtain the desired properties. The sum of ZnO+MgO is preferably less than 18 weight percent in order to maintain transparency and achieve the desired strain point and thermal expansion.

The sum of ($TiO_2$+$ZrO_2$) is preferably at least 4% to optimize nucleation and transparency. Titania serves as both an extremely effective nucleating agent in these glasses and as an integral component of the spinel crystals. While titania alone, zirconia alone, or mixtures of the two oxides will nucleate the spinel phase, nucleation with zirconia alone is generally not desired from a practical point of view, as $ZrO_2$ significantly raises the liquidus temperature of the glass and gives very steep viscosity curves and the ever-present danger of stoning. Zirconia also increases the density of the glass-ceramics, which is undesirable for most applications. Moreover, zirconia is less efficient than titania in nucleating spinel in glasses that contain significant levels of magnesia. If not well nucleated, magnesia-containing glasses in this composition range tend to produce P-quartz solid solution and Mg-petalite instead of or in addition to spinet, leading to undesirable crystal growth and subsequent haziness or opacity in the glass-ceramic, as well as cracking in the most severe cases. The more magnesia in a composition, the higher the level of titania required to efficiently nucleate the spinel phase. While 5% $TiO_2$ is sufficient in Mg-free spinel compositions, a minimum of 7.5% $TiO_2$ generally is required in compositions with more than about 2% MgO by weight, providing $ZrO_2$ is absent.

Glass-ceramics typically have strain point temperatures significantly higher than those of their precursor glasses because the crystal phases take up many of the fluxing agents in the glass, leaving the residual glass (which is actually the "glass" whose strain point is measured in the glass-ceramic) with fewer fluxes--therefore "harder"—than the precursor glass. The glass-ceramics described herein are designed to have a residual glass whose composition is high in silica content and also theoretically very similar structurally to silica, thereby providing strain points in excess of 850° C., preferably over 875° C., more preferably over 900° C., and most preferably over 925° C.

For the highest possible strain points, the residual glass (i.e., the portion that is not crystalline) in these glass-ceramics should have a composition as close to that of pure silica as possible, or with as few non-bridging oxygens as possible. For this reason, the preferred glass-ceramics are designed to have molar ratios of $(R_2O+RO)/Al_2O_3$ between about 0.5 and 1.5, more preferably about 0.75 to 1.25 and most preferably about 0.85 to 1.15, where $R_2O$=alkali oxides and RO=alkaline earth oxides+ZnO. These ratios can serve as useful indicators of the overall peraluminousness or peralkalinity of the system, which in turn acts as a reasonable predictor of properties such as strain point. It is believed that, the higher these ratios, the more non-bridging oxygen atoms there will be in the residual glass and thus the lower the strain point of the glass-ceramic. Generally, the more peraluminous compositions yield the highest strain points, but often with sacrifices in glass stability and liquidus/viscosity relationships.

Preferably, the composition of precursor glass, and ultimately the glass-ceramic, comprises or consists essentially, expressed in terms of weight percent on the oxide basis, of about:

| | | | |
|---|---|---|---|
| $SiO_2$ | 50–64 | BaO | 0–4 |
| $Al_2O_3$ | 16–22 | $Cs_2O$ | 0–5 |
| ZnO | 6–13 | | |
| MgO | 1–5 | | |
| $TiO_2$ | 0–10 | (ZnO + MgO) $\geq$ 9% | |
| $ZrO_2$ | 0–6 | $(TiO_2 + ZrO_2) \geq 5\%$ | |

Most preferably, the composition of precursor glass, and ultimately the glass-ceramic, comprises or consists essentially, expressed in terms of weight percent on the oxide basis, of about:

| | | | |
|---|---|---|---|
| $SiO_2$ | 55–62 | BaO | 0–3 |
| $Al_2O_3$ | 18–22 | $Cs_2O$ | 0–4 |
| ZnO | 8–11 | | |
| MgO | 2–5 | | |
| $TiO_2$ | 0–10 | (ZnO + MgO) $\geq$ 9% | |
| $ZrO_2$ | 0–6 | $(TiO_2 + ZrO_2) \geq 5\%$ | |

STEM micrographs indicate that the size of the spinel crystals of the preferred transparent glass-ceramics of the present invention range from 75 to 200 Å in diameter (7.5–20 nm). Partly due to the ultra fine crystal size, these materials can be polished in the glass state to a surface roughness (Ra) of less than 10 Å, over a surface area of 2 microns×2 microns, and will retain this degree of surface roughness after ceramming to a glass-ceramic.

The materials of the present invention are compatible with conventional glass melting and forming processes, particularly rolling, and should thereby enable cost effective manufacture of large sheets required for substrates for thin film polysilicon solar cells, or flat panel displays. Moreover, their higher rigidity and strength compared to glass or fused silica should permit the use of thinner sheets in, for example, substrates for active matrix liquid crystal displays and other flat panel displays.

The above-described transparent glass-ceramic can be obtained by the conventional two-stage heat treatment used for development of nuclei and subsequent growth of crystals. It can also be obtained by a one-stage heat treatment. In a one (or two) stage heat treatment, the upper limit of the temperature for growing crystals should preferably be in the range of 875–1050° C.

The invention is further illustrated by the following examples, which are meant to be illustrative, and not in any way limiting, to the claimed invention. Table I records a number of glass compositions, expressed in terms of part by weight on the oxide basis, illustrating the compositional parameters of the present invention. Inasmuch as the sum of the individual constituents totals or very closely approximates 100, for all practical purposes the reported values may be deemed to represent weight percent. The actual batch ingredients may comprise any materials, either oxides or other compounds, which, when melted together with the other batch components, will be converted into the desired oxide in the proper proportions.

The glass-ceramics described in Table I were prepared using standard laboratory procedures. Glass batches were ball milled and melted in platinum crucibles at 1600°–1625° C. for 6 to 16 hours and cast onto steel plates as 6"×6"×0.5" patties. The glass patties were annealed for one hour at 725°–750° C. and subsequently cooled overnight. Coupons were then cut from the glass patties and cerammed using one or more heat treatment schedules, as noted in Table I (H.T.). The glasses of the present invention may be nucleated at 775°–800° C. for 1–2 hours and then crystallized for 2–4 hours at temperatures of 850°–1050° C. Standard powder X-ray diffraction techniques were used to determine the crystal phase(s) present in the glass-ceramic. In all of the examples cited, the sole crystal phase present is spinel solid solution (s.s.). Also reported in Table I are the mole percent ratios of $(R_2O+RO)/Al_2O_3$, where $R_2O$=alkali oxides and RO=alkaline earth oxides+ZnO. These values are listed under $\Sigma RO/Al_2O_3$.

Table I also lists measurements of several chemical and physical properties determined on the glass ceramics in accordance with techniques conventional in the glass art. Strain point, expressed in terms of ° C., was determined by beam bending viscometry. The linear coefficient of thermal expansion (CTE) over the temperature range 25°–300° C. expressed in terms of $X10^{-7}/°$ C., was measured using dilatometry. Density is listed, for several of the examples, in grams/cc.

Also reported in Table I are liquidus related data, including liquidus temperature, liquidus viscosity, as well as the temperature at which the precursor glasses exhibit a viscosity of 300 poise, $10^3$ poise, $10^4$ poise, and $10^5$ poise. This viscosity information is relevant because, in a preferred embodiment of the invention, the glass ceramic composition is chosen to result in a glass material which has a relatively large working viscosity range. Working viscosity range, as used in herein, refers to the temperature range over which the glass ceramics exhibit a viscosity of $10^3$–$10^5$ poise. Preferably, this range is at least 200° C. For example, in Example 16, the working viscosity range is 236° C. (1416°–1180° C.).

TABLE 1

Glass-Ceramic Compositions and Properties

| Oxide | 1 | 2 | 3 | 4 | 5 | 6 | 7 |
|---|---|---|---|---|---|---|---|
| $SiO_2$ | 57.5 | 61.5 | 60.2 | 58.3 | 58.8 | 59.6 | 58.9 |
| $Al_2O_3$ | 22.5 | 18.4 | 18.4 | 20.2 | 20.4 | 18.4 | 20.4 |
| ZnO | 8.5 | 8.1 | 10.6 | 8.4 | 6.8 | 8.6 | 7.7 |
| MgO | 4.2 | 4.0 | 2.8 | 4.2 | 5.0 | 4.3 | 4.6 |
| $Cs_2O$ | — | — | — | — | — | — | — |
| BaO | — | — | — | — | — | — | — |
| $TiO_2$ | 7.3 | 3.0 | 3.0 | 3.0 | 3.0 | 3.0 | 3.2 |
| $ZrO_2$ | — | 5.0 | 5.0 | 5.0 | 5.0 | 5.0 | 5.3 |
| $NH_4NO_3$ | 1.0 | 1.0 | 1.0 | — | — | — | 1.0 |
| $As_2O_3$ | 0.5 | 0.5 | 0.5 | — | — | — | 0.5 |
| CaO | — | — | — | — | — | — | — |
| $\Sigma RO/Al_2O_3$ | 0.95 | 1.11 | 1.11 | 1.05 | 1.05 | 1.18 | 1.05 |
| H.T. | 800/1, 900/2 | 800/1, 900/2 | 800/1, 875/2 | 800/1, 900/2 | 800/1, 900/2 | 800/1, 900/2 | 800/1, 900/2 |
| $CTE(10^{-7}/°C.)$ | 39.4 | 35.3 | 34.9 | 37.7 | 37.1 | 35.1 | 37.5 |
| Strain Point | 946 | 937 | 935 | 946 | 948 | 930 | 940 |
| Density | | | | 2.76 | | 2.72 | 2.76 |
| Liq. Temp. | | | | 1475 | 1495 | 1500 | |
| Liq. Visc. | | | | 350 | | | |
| T @ 300 poise | | | | 1490 | | | |
| T @ $10^3$ poise | | | | 1393 | | | |
| T @ $10^4$ poise | | | | 1257 | | | |
| T @ $10^5$ poise | | | | 1162 | | | |

| Oxide | 8 | 9 | 10 | 11 | 12 | 13 | 14 |
|---|---|---|---|---|---|---|---|
| $SiO_2$ | 58.9 | 57.0 | 55.7 | 57.7 | 55.0 | 53.6 | 56.5 |
| $Al_2O_3$ | 20.4 | 18.3 | 19.3 | 20.0 | 19.2 | 21.2 | 19.7 |
| ZnO | 7.7 | 8.4 | 9.0 | 8.5 | 13 | 11.3 | 9.7 |
| MgO | 4.6 | 2.0 | 2.0 | 3.5 | — | 2.0 | 2.0 |
| $Cs_2O$ | — | 4.1 | 4.0 | 2.1 | 2.0 | 2.0 | — |
| BaO | — | 2.0 | 2.0 | — | 3.1 | 2.0 | 4.6 |
| $TiO_2$ | 5.3 | 5.1 | 5.0 | 5.1 | 4.9 | 5.0 | 5.0 |
| $ZrO_2$ | 3.2 | 3.1 | 3.0 | 3.1 | 2.9 | 3.0 | 2.5 |
| $NH_4NO_3$ | 1.0 | — | — | — | — | — | 1.0 |
| $As_2O_3$ | 0.5 | — | — | — | — | — | 0.5 |
| $\Sigma RO/Al_2O_3$ | 1.05 | 1.0 | 1.0 | 1.0 | 1.0 | 1.0 | 1.0 |
| H.T. | 800/1, 900/2 | 800/1, 900/2 | 800/1, 900/2 | 800/1, 900/2 | 800/1, 900/2 | 800/1, 900/2 | 800/1, 900/2 |
| $CTE(10^{-7}/°C.)$ | 38.3 | 37.1 | 39.1 | 37.5 | 38.9 | 40.3 | 39.1 |
| Strain Point | 943 | 891 | 905 | 948 | 915 | 928 | 868 |
| Density | 2.75 | | | | | | |
| Liq. Temp. | | | | 1435 | | 1475 | 1460 |
| Liq. Visc. | | | | 700 | | | |
| T @ 300 poise | | 1550 | 1530 | 1500 | 1500 | | |
| T @ $10^3$ poise | | 1443 | 1420 | 1420 | 1400 | | |
| T @ $10^4$ poise | | 1291 | 1280 | 1265 | 1260 | | |
| T @ $10^5$ poise | | 1180 | 1200 | 1190 | 1160 | | |

| Oxide | 15 | 16 | 17 | 18 | 19 | 20 |
|---|---|---|---|---|---|---|
| $SiO_2$ | 57.4 | 59.0 | 57.3 | 57.4 | 58.8 | 63.0 |
| $Al_2O_3$ | 18.5 | 19.1 | 18.5 | 17.7 | 20.0 | 17.8 |
| ZnO | 13.0 | 9.0 | 11.6 | 10.1 | 6.7 | 5.7 |
| MgO | — | 2.5 | 2.4 | — | 4.9 | 4.2 |
| $Cs_2O$ | — | — | — | — | — | — |
| BaO | 3.1 | 2.1 | 2.0 | 3.2 | 1.6 | 1.3 |
| $TiO_2$ | 5.0 | 5.1 | 5.0 | 5.1 | 5.0 | 5.0 |
| $ZrO_2$ | 3.0 | 3.1 | 3.0 | 3.1 | 3.0 | 3.0 |
| $NH_4NO_3$ | — | — | — | — | — | — |
| $As_2O_3$ | — | — | — | — | 0.5 | 0.5 |
| $La_2O_3$ | — | — | — | 3.4 | — | — |
| $\Sigma RO/Al_2O_3$ | 1.0 | 1.0 | 1.2 | 1.0 | — | — |
| H.T. | 800/1, 900/2 | 800/1, 900/2 | 800/1, 900/2 | 800/1, 900/2 | 800/1, 1000/2 | 800/1, 1000/2 |
| $CTE(10^{-7}/°C.)$ | 37.1 | 37.6 | 38.4 | 37.3 | 36.8 | 33.7 |
| Strain Point | 933 | 913 | 922 | 909 | 899 | 908 |
| Density | | 2.76 | | | 2.74 | 2.67 |
| Liq. Temp/°C. | | 1425 | | | 1360 | 1460 |

TABLE 1-continued

Glass-Ceramic Compositions and Properties

| Liq. Visc. | | 950 | | |
|---|---|---|---|---|
| T @ 300 poise | 1510 | 1520 | 1485 | 1530 |
| T @ $10^3$ poise | 1400 | 1416 | 1385 | 1425 |
| T @ $10^4$ poise | 1260 | 1275 | 1245 | 1280 |
| T @ $10^5$ poise | 1160 | 1180 | 1140 | 1170 |

The microstructure of stable oxide crystals in a matrix of highly siliceous residual glass also provides these materials with excellent chemical durability. Representative data are given in Table II, comparing weight loss in standard acid, base, and buffered solutions with an internal benchmark glass, Corning's Code 7940 fused silica.

TABLE 2

Chemical Durability

| wt % | 16 | Fused Silica |
|---|---|---|
| $SiO_2$ | 59.3 | 100 |
| $Al_2O_3$ | 19.1 | — |
| ZnO | 9.0 | — |
| $ZrO_2$ | 3.0 | — |
| $TiO_2$ | 5.0 | — |
| $As_2O_5$ | 0.5 | — |
| BaO | 2.1 | — |
| MgO | 2.5 | — |
| Δ Weight (mg/cm2) in: | | — |
| 5% HCl, 95° C., 24 hrs | −0.021 | −0.001 |
| 5% NaOH, 95° C., 6 hrs | −0.47 | −0.57 |
| 10% HF, 25° C., 20 min. | −0.19 | −0.22 |
| 10% $NH_4F.HF$, 25° C., 20 min. | −0.14 | −0.20 |

The most preferred glass ceramic compositions of the present invention are Examples 4 and 16, with the most preferred currently being Example 16.

In a preferred embodiment, the glass-ceramics described herein are manufactured using a ceram and cooling schedule as set forth below, in which they are first exposed to a nucleation heat treatment (e.g. 800° C. for 2 hours) to promote phase separation and growth of nuclei. They are then exposed to a higher temperature heat treatment (e.g. 1000° C. for 4 hours) to promote growth of the primary crystal phase. The substrate is then cooled slowly to a temperature of about 800° C. to allow for optimal densification of the siliceous residual glass. Thereafter the glass may be cooled at a rapid, more convenient rate from 800° C. to room temperature. Such ceraming and cooling schedules are further set forth in U.S. patent application Ser. No. filed simultaneously herewith, the specification of which is hereby incorporated by reference.

| Nucl. | Growth | Cooling |
|---|---|---|
| 800° C./2 hrs. | 1000° C./4 hrs. | 1000 to 950° C. @ 0.5° C./min. |
| | | 950 to 900° C. @ 0.1° C./min. |
| | | 900 to 875° C. @ 0.2° C./min. |
| | | 875 to 700° C. @ 2° C./min. |
| | | 700 to RT @ 10° C./min. |

Although the invention has been described in detail for the purpose of illustration, it is understood that such detail with solely for that purpose and variations can be made therein by those skilled in the art without departing from the spirit and scope of the invention which is defined by the following claims.

What is claimed is:

1. A transparent glass-ceramic containing spinel as a predominant crystal phase and exhibiting a linear coefficient of thermal expansion (CTE) over the temperature range 0°–300° C. between $32$–$42 \times 10^{-7}/°$ C., said glass-ceramic comprising the following composition as calculated in weight percent on an oxide basis: 45–65 $SiO_2$, 14–28 $Al_2O_3$, 4–13 ZnO, 0–8 MgO, 0–10 $TiO_2$, 0–6 $ZrO_2$, 0–15 $Cs_2O$, 0–6 BaO, ZnO+MgO in combination being greater than or equal to about 8, $TiO_2$+$ZrO_2$ in combination being greater than or equal to about 4, and the molar ratio of $(R_2O+RO)/Al_2O_3$ being between about 0.5 and 1.5, where $R_2O$ is the sum of the moles of alkali oxides and RO is the sum of the moles of alkaline earth oxides plus ZnO.

2. The glass-ceramic of claim 1, wherein said glass-ceramic has a strain point greater than about 850° C.

3. The glass-ceramic of claim 1, wherein said glass-ceramic has a CTE of $35$–$40 \times 10^{-7}/°$ C.

4. The glass-ceramic of claim 3, wherein said glass-ceramic has a strain point greater than about 875° C.

5. The glass-ceramic of claim 3, wherein said glass-ceramic has a strain point greater than about 900° C.

6. The glass-ceramic of claim 3, wherein said glass-ceramic has a strain point greater than about 925° C.

7. The glass-ceramic of claim 1, wherein ZnO+MgO in combination is less than about 20 weight percent.

8. The glass-ceramic of claim 1, wherein ZnO+MgO in combination is less than about 18 weight percent.

9. A glass-ceramic according to claim 1, further comprising at least one component selected from the group consisting of the transition metal oxides; $P_2O_5$, $Rb_2O$, CaO, SrO, $B_2O_3$, sulfates, and halides, in an amount not exceeding 5 weight percent in total.

10. A glass-ceramic according to claim 1, further comprising at least one ingredient selected from the group consisting of $Bi_2O_3$, $Ta_2O_5$, $Ga_2O_3$, PbO, or $La_2O_3$ in an amount not exceeding 10 weight percent.

11. A glass-ceramic according to claim 1, comprising one or more of $L_2O$, $Na_2O$, and $K_2O$ in an amount less than 3 weight percent.

12. In a photovoltaic device, the improvement comprising a substrate having a glass-ceramic composition in accordance with claim 1.

13. In a flat panel display device, the improvement comprising a substrate having a glass-ceramic composition in accordance with claim 1.

14. In a liquid crystal display device, the improvement comprising a substrate having a glass-ceramic composition in accordance with claim 1.

15. A glass-ceramic according to claim 1, wherein said glass-ceramic has a composition comprising, as expressed in weight percent: 50–64 $SiO_2$, 16–22 $Al_2O_3$, 6–13 ZnO, 1–5 MgO, 0–10 $TiO_2$, 0–6 $ZrO_2$, 0–4 BaO, 0–5 $Cs_2O$, ZnO+MgO in combination being greater than or equal to about 9, and $TiO_2$+$ZrO_2$ in combination being greater than or equal to about 5.

16. The glass-ceramic of claim 15, wherein said glass-ceramic has a strain point greater than about 850° C.

17. The glass-ceramic of claim 15, wherein said glass-ceramic has a CTE of $35$–$40 \times 10^{-7}/°$ C.

18. The glass-ceramic of claim 17, wherein said glass-ceramic has a strain point greater than about 875° C.

19. The glass-ceramic of claim 17, wherein said glass-ceramic has a strain point greater than about 900° C.

20. The glass-ceramic of claim 17, wherein said glass-ceramic has a strain point greater than about 925° C.

21. The glass-ceramic of claim 15, wherein ZnO+MgO in combination is less than about 20 weight percent.

22. The glass-ceramic of claim 15, wherein ZnO+MgO in combination is less than about 18 weight percent.

23. A glass-ceramic according to claim 15, further comprising at least one component selected from the group consisting of the transition metal oxides, $P_2O_5$, $Rb_2O$, CaO, SrO, sulfates, and halides, in an amount not exceeding 5 weight percent in total.

24. A glass-ceramic according to claim 15, further comprising at least one ingredient selected from the group consisting of $Bi_2O_3$, $Ta_2O_5$, $Ga_2O_3$, PbO, or $La_2O_3$ in an amount not exceeding 10 weight percent.

25. A glass-ceramic according to claim 15, comprising one or more of $Li_2O$, $Na_2O$, and $K_2O$ in an amount less than 3 weight percent.

26. In a photovoltaic device, the improvement comprising a substrate having a glass-ceramic composition in accordance with claim 15.

27. In a flat panel display device, the improvement comprising a substrate having a glass-ceramic composition in accordance with claim 15.

28. In a liquid crystal display device, the improvement comprising a substrate having a glass-ceramic composition in accordance with claim 15.

29. The glass ceramic of claim 1, wherein the molar ratio of $(R_2O+RO)/Al_2O_3$ is between about 0.75 and 1.25.

30. The glass ceramic of claim 1, wherein the molar ratio of $(R_2O+RO)/Al_2O_3$ is between about 0.85 and 1.15.

* * * * *